(12) United States Patent
Patterson et al.

(10) Patent No.: US 7,204,512 B2
(45) Date of Patent: Apr. 17, 2007

(54) MULTI-STAGE INFLATOR WITH SYMPATHETIC IGNITION ENHANCEMENT DEVICE

(75) Inventors: Donald B. Patterson, Rochester, MI (US); Roberta A. Armstrong, New Baltimore, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 78 days.

(21) Appl. No.: 11/044,524

(22) Filed: Jan. 27, 2005

(65) Prior Publication Data

US 2005/0161926 A1 Jul. 28, 2005

Related U.S. Application Data

(60) Provisional application No. 60/541,089, filed on Feb. 2, 2004, provisional application No. 60/539,801, filed on Jan. 28, 2004.

(51) Int. Cl.
*B60R 21/26* (2006.01)

(52) U.S. Cl. .................. 280/736; 280/741; 280/742

(58) Field of Classification Search ............... 280/741, 280/736, 742, 740
See application file for complete search history.

(56) References Cited

U.S. PATENT DOCUMENTS

| | | | |
|---|---|---|---|
| 5,219,178 A | 6/1993 | Kobari et al. ............... 280/736 |
| 5,308,370 A | 5/1994 | Kraft et al. .................... 55/487 |
| 5,346,254 A | 9/1994 | Esterberg | |
| 5,872,329 A | 2/1999 | Burns et al. | |
| 6,009,809 A | 1/2000 | Whang | |
| 6,074,502 A | 6/2000 | Burns et al. | |
| 6,089,598 A | 7/2000 | Snyder et al. ............. 280/740 |
| 6,210,505 B1 | 4/2001 | Khandhadia et al. | |
| 6,485,051 B1 | 11/2002 | Taguchi et al. ............. 280/736 |
| 6,607,214 B2 | 8/2003 | Blakemore et al. | |
| 6,871,873 B2 * | 3/2005 | Quioc et al. ................. 280/741 |
| 6,913,284 B2 * | 7/2005 | Haeuslmeier et al. ....... 280/735 |
| 2004/0195813 A1 | 10/2004 | Canterberry et al. ........ 280/741 |
| 2005/0161923 A1 * | 7/2005 | Hirooka et al. ............. 280/741 |
| 2006/0017270 A1 | 1/2006 | Quloc et al. | |

* cited by examiner

*Primary Examiner*—Eric Culbreth
(74) *Attorney, Agent, or Firm*—L.C. Begin & Associates, PLLC

(57) ABSTRACT

An airbag inflator (10, 110, 210) is provided which includes a first chamber (20, 120, 220) containing a quantity of a first gas generant composition (16, 116), a second chamber (30, 130, 230) containing a quantity of a second gas generant composition (17, 117), and a sympathetic ignition enhancement apparatus (40, 140, 240) for sympathetically igniting the second gas generant composition (17, 117) in response to combustion of the first gas generant composition (16, 116). The ignition apparatus (40, 140, 240) is in thermal communication with both the first gas generant composition (16, 116) and the second gas generant composition (17, 117). Heat from combustion of the first gas generant composition (16, 116) is communicated through conduction along the ignition apparatus (40, 140, 240) to produce sympathetic ignition of the second gas generant composition (17, 117).

25 Claims, 2 Drawing Sheets

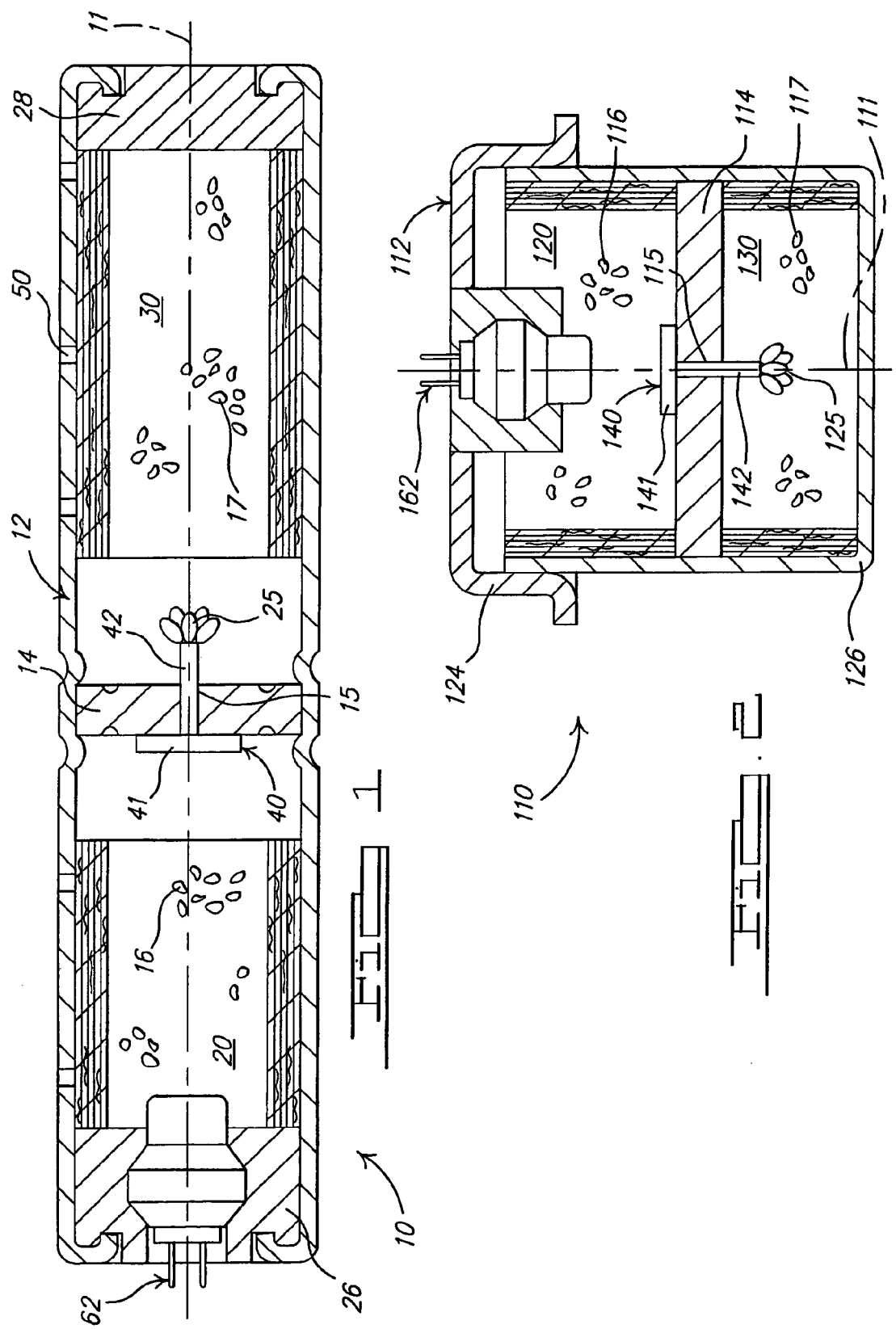

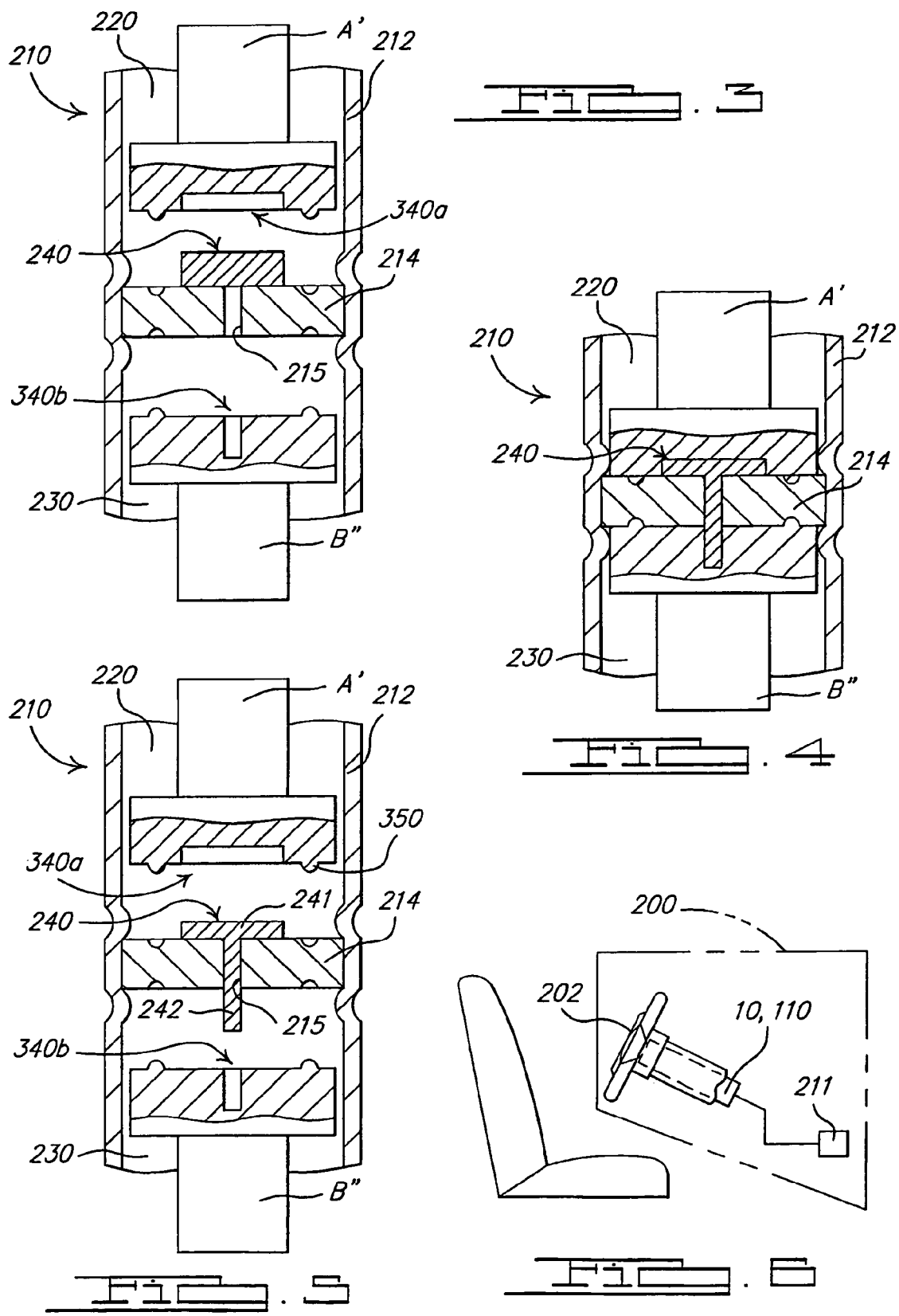

MULTI-STAGE INFLATOR WITH SYMPATHETIC IGNITION ENHANCEMENT DEVICE

CROSS REFERENCE TO RELATED APPLICATIONS

This application claims the benefit of provisional application Ser. No. 60/539,801, filed on Jan. 28, 2004 and provisional application Ser. No. 60/541,089, filed on Feb. 2, 2004.

BACKGROUND OF THE INVENTION

The present invention relates to inflators for vehicle airbags and, more particularly, to an inflator having multiple chambers and incorporating a device that facilitates sympathetic ignition of a propellant charge in one of the inflator chambers.

Certain inflator designs incorporate multiple combustion chambers, with a quantity of gas generant stored in each of the chambers. Many of these inflators are designed such that combustion of the gas generant in one chamber initiates sympathetic combustion of the gas generant in another chamber. In existing designs, the ignition sequence of the gas generants may be controlled by a separate igniter in communication with each chamber. Provision of an igniter and its accompanying support structure for each chamber greatly increases the bulk, complexity, and manufacturing cost of the inflator.

SUMMARY OF THE INVENTION

In accordance with the present invention, an airbag inflator is provided which includes a first chamber containing a quantity of a first combustible material, a second chamber containing a quantity of a second combustible material, and a thermally-conductive ignition apparatus for sympathetically igniting the second combustible material in response to combustion of the first combustible material. The ignition apparatus is in thermal communication with both the first combustible material and the second combustible material. Heat from combustion of the first combustible material is communicated along the ignition apparatus to produce ignition of the second combustible material.

In one embodiment, the first combustible material comprises a first gas generant composition, the second combustible material comprises a second gas generant composition, and the ignition apparatus includes a thermally-conductive member and a heat-activated auto-ignition material thermally coupled to the thermally-conductive member. Sympathetic ignition of the second gas generant composition is produced by ignition of the auto-ignition material resulting from heat from combustion of the first gas generant composition communicated along the thermally-conductive member.

In another embodiment, the first combustible material comprises a first gas generant composition, the second combustible material comprises a heat-activated auto-ignition material, and the ignition apparatus includes a thermally-conductive member. Sympathetic ignition of the auto-ignition material is produced by heat from combustion of the first combustible material communicated along the thermally-conductive member.

BRIEF DESCRIPTION OF THE DRAWINGS

In the drawings illustrating embodiments of the present invention:

FIG. 1 is a cross-sectional side view of a first embodiment of an inflator in accordance with the present invention;

FIG. 2 is a cross-sectional side view of a second embodiment of an inflator in accordance with the present invention;

FIG 3. is a cross-sectional side view of a portion of an inflator showing a step in a method for manufacturing the inflator in accordance with the present invention;

FIG 4. is a cross-sectional side view of the portion of the inflator shown in FIG 3, showing a further step in the method for manufacturing the inflator in accordance with the present invention;

FIG 5. is a cross-sectional side view of the portion of the inflator shown in FIG 4, showing a further step in the method for manufacturing the inflator in accordance with the present invention; and FIG 6. is a schematic representation of an exemplary vehicle occupant restraint system incorporating an inflator in accordance with the present invention.

DETAILED DESCRIPTION

FIG. 1 shows a cross-sectional view of one embodiment of an inflator 10 in accordance with the present invention. Inflator 10 is contemplated for use primarily in driver-side inflatable restraint systems in motor vehicles, such as are known in the art; however, it is not limited thereto. The components of inflator 10 may be manufactured from known materials and by known processes.

Inflator 10 includes an elongate, cylindrical inflator body 12 defining an enclosure. Inflator body 12 may be cast, stamped, extruded, or otherwise metal-formed. Endcaps 26 and 28 are secured at opposite ends of inflator body 12 using one or more known methods, to close the ends of the inflator body. In FIG. 1, ends of inflator body 12 are crimped over portions of first and second caps 26, 28 to secure the caps within the inflator body. Inflator body 12 is generally provided with a plurality of inflation gas exit apertures 50 spaced therealong to enable fluid communication between an interior and an exterior of the inflator.

An internal wall 14 is disposed within inflator body 12 intermediate the ends thereof, defining first and second inflator chambers 20 and 30, respectively. Wall 14 is preferably formed from metal or ceramic and is oriented along a plane perpendicular to a longitudinal axis 11 of inflator body 12. Wall 14 is roll-crimped or otherwise secured within inflator body 12 so as to maintain the wall in its position within the inflator body when the wall is subjected to pressures generated by combustion of gas generants stored within the inflator body. In a preferred embodiment, wall 14 is a substantially cylindrical member having a central aperture 15.

A quantity of a first propellant or gas generant composition 16 is positioned in chamber 20, and a quantity of a second gas generant composition 17 is positioned in chamber 30. Any suitable propellant might be used and exemplary compounds are disclosed, for example, in U.S. Pat. Nos. 5,872,329, 6,074,502, and 6,210,505, incorporated herein by reference. The compositions described in these patents exemplify, but do not limit, gas generant compositions useful in the application described herein.

Referring again to FIG. 1, end cap 26 supports an igniter 62 positioned such that it can ignite the first gas generant composition 16 in chamber 20 in a conventional manner.

The illustrated position and orientation of igniter 62 might be varied without departing from the scope of the present invention, depending on space and manufacturing requirements. Further, igniter 62 need not be positioned within inflator body 12. One example of an igniter suitable for the application described herein is disclosed in U.S. Pat. No. 6,009,809, incorporated herein by reference. Other igniters mountable so as to be in communication with chamber 20 may also be used.

In accordance with the present invention, a thermally-conductive ignition apparatus is provided for sympathetically igniting a second combustible material in response to combustion of a first combustible material. The ignition apparatus is in thermal communication with both the first combustible material and the second combustible material. Heat from combustion of the first combustible material is communicated along the ignition apparatus to produce ignition of the second combustible material.

Referring again to FIG. 1, in a particular embodiment, the first combustible material comprises first gas generant composition 16, the second combustible material comprises second gas generant composition 17, and the ignition apparatus includes a thermally-conductive member 40 and a heat-activated auto-ignition material 25 thermally coupled to thermally-conductive member 40. Sympathetic ignition of second gas generant composition 17 is produced by ignition of auto-ignition material 25 resulting from heat from combustion of first gas generant composition 16 communicated along thermally-conductive member 40.

Thermally-conductive sympathetic ignition device 40 is preferably positioned adjacent wall 14, and facilitates sympathetic ignition between first gas generant composition 16 positioned in chamber 20 and second gas generant composition 17 positioned in chamber 30, by conducting heat therebetween. In general, device 40 is in thermal communication with both the first and second gas generant compositions. As used herein, the term "in thermal communication" is understood to mean that the elements stated as being in thermal communication are capable of receiving heat from, or transferring heat to, each other.

In the embodiment shown in FIG. 1, device 40 comprises a thermally conductive member having a substantially circular head 41 and a shaft 42 formed integrally with, and extending axially from, head 41. Device 40 provides a surface area (along head 41) exposed to chamber 20. In the embodiment shown in FIG. 1, head 41 is in the form of a relatively thin plate having a substantially uniform thickness. This configuration of head 41 provides for relatively rapid heating of head 41. Device 40 further provides for thermal communication between chamber 20 and chamber 30, primarily via shaft 42. Ignition device head 41 and shaft 42 are formed from a thermally-conductive metallic material. Suitable thermally-conductive materials are well known to those skilled in the art. A preferred metal is copper. Aluminum can also be used. In addition transition metals may be used.

In alternative embodiments, head 41 and shaft 42 of device 40 might be formed having alternative shapes and proportions. For example, alternative shapes or relatively larger or smaller relative sizes of head 41 might be desirable in different inflator designs or those using different types of propellants.

A quantity of ignition compound 25, for example a heat-activated auto-ignition compound such as is known in the art, is preferably positioned proximate or in contact with a tip of shaft 41 extending into chamber 30. The auto ignition material 25 is a pyrotechnic material which is ignited by exposure to a temperature lower than the ignition temperature of second gas generant composition 17 positioned in chamber 30. Auto-ignition material 25 produces a hot gas/particulate effluent when ignited. Suitable auto ignition materials are known to those skilled in the art. Examples of suitable auto-ignition materials are nitro-cellulose based compositions and gun powder.

In an alternative embodiment of the ignition apparatus, the first combustible material comprises first gas generant composition 16, the second combustible material comprises heat-activated auto-ignition material 25, and the ignition apparatus includes thermally-conductive member 40. Sympathetic ignition of auto-ignition material 25 is produced by heat from combustion of first gas generant material 16 communicated along thermally-conductive member 40.

In another alternative embodiment (not shown), the heat-activated auto-ignition compound is omitted, and a portion of ignition device shaft 42 is in direct contact with second gas generant composition 17. In this embodiment, the combustion temperature of the first gas generant composition and the heat transfer characteristics of ignition device head 41 and shaft 42 should be specified such that the portion of the shaft in contact with the second gas generant composition will be heated to a temperature sufficient to ignite the second gas generant without the use of the auto-ignition material.

Turning to FIG. 2, there is shown a second embodiment 110 of an inflator in accordance with the present invention. In FIG. 2, like numerals are used to identify features similar to those identified in FIG. 1. Inflator 110 is a disk-type inflator such as are commonly used in driver-side inflatable restraint systems; however, it is not thereby limited. Inflator 110 includes a metal inflator body 112, for example formed from a pair of nested cups, and includes an internal wall 114 such that an interior of inflator 110 is divided into first and second chambers 120 and 130. In the embodiment shown in FIG. 2, inflator body 112 is formed by bonding or welding two sections 124 and 126 to one another in nested relationship. Section 124 supports an igniter 162 positioned such that it can ignite the first gas generant in chamber 120 in a conventional manner. Wall 114 is preferably formed from metal or ceramic and is orientated in plane perpendicular to a longitudinal axis 111 of inflator body 120.

Similar to wall 14 of FIG. 1, wall 114 is secured within inflator body 112 (for example, by welding) so as to maintain the wall in its position within the inflator body when the wall is subjected to pressures generated by combustion of gas generants stored within the inflator body. In a preferred embodiment wall 114 is a substantially cylindrical member having a central aperture 115. Similar to inflator 10 of FIG. 1, chamber 120 of inflator 110 includes a quantity of a first gas generant composition 116 and chamber 130 includes a quantity of a second gas generant composition 117 for providing an inflation gas to a vehicle airbag. An ignition enhancement device 140 is provided in inflator 110, and preferably comprises a member similar in construction to device 40 shown in FIG. 1, including a head 141 and a shaft 142 formed integrally with, and extending axially from, head 141. The components of inflator 110 can be manufactured from known materials and by known processes.

In operation, both of the aforementioned inflator embodiments function in a similar fashion. When deployment of the vehicle inflatable restraint system is desired, an activation signal is sent to igniter 62, 162 operably associated with the first chamber 20, 120 of the inflator 10, 110. First gas generant 16, 116 positioned in first chamber 20 is consequently ignited, directly or via a booster propellant such as is known in the art. Ignition of the first gas generant causes a rapid production of hot inflation gases in first chamber 10, 110. Heat produced during combustion is communicated via ignition device 40, 140 to second chamber 30, 130. In a preferred embodiment, relatively rapid heating of device 40, 140 induces a combustion of auto-ignition compound 25, 125. Combustion of auto-ignition compound 25, 125 causes second gas generant 17, 117 positioned in second chamber 30, 130 to ignite, rapidly producing an inflation gas for the associated inflatable restraint system. The dual chamber design allows for particular deployment characteristics of the associated airbag system. An exemplary but not limiting dual stage inflator design and operation is described in U.S. patent application Ser. No. 10/335, incorporated by reference herein.

Referring to FIGS. 3–5, in another aspect the present invention provides a method of manufacturing an inflator and a sympathetic ignition enhancement device incorporated therein. The manufacturing method is illustrated for an inflator 210 similar to the inflator shown previously in FIG. 1. However, it is understood that the method described herein is equally applicable to other types of inflator designs, including the type of inflator shown in FIG. 2 and described previously.

Referring to FIG. 3, in a typical manufacturing method, a material slug 240 is positioned within inflator body 212 adjacent wall 214 during assembly. Material slug 240 used to form the sympathetic ignition enhancement device is positioned adjacent internal wall 214. A coining press is provided included coining tools A' and B" specially designed so as to form slug 240 into a desired shape having a head 241 and a shaft 242, substantially as shown in FIG. 5. Tools A' and B" preferably include inwardly extending die surfaces 340A and 340B that facilitate pressing of slug 240 into the desired shape.

Referring to FIGS. 4 and 5, first and second tools A' and B" are engaged to simultaneously coin internal wall 214 and to form material slug 240. Specifically, when tools A' and B" are engaged, a set of bosses 350 on each of tools A' and B" provide a coining function, forcing portions of internal wall 214 radially outward against the outer wall of inflator body 212, whereby the retention of wall 214 in inflator is enhanced. During manufacturing, tools A' and B" are preferably brought together from opposite sides of wall 214, allowing wall 214 and material slug 240 to be pressed therebetween. Because slug 240 is preferably made from a relatively malleable material such as copper or aluminum, the squeezing force of tools A' and B" will cause it to be squeezed into a shape substantially conforming to die surface 340a and 340b. During compression of slug 240, some of its constituent material will have a tendency to be forced through or extruded through an aperture 215 in wall 214.

The manufacturing process thus provides a surface area on head 241 that can conduct heat from combustion in the inflator first chamber 220, to the second chamber 230 via shaft 242. The process further provides for coining of wall 214, extruding/forming of device 240, and forging of wall 214 and device 240 together. A quantity of autoignition material (not shown) may then be positioned proximate shaft 242, to facilitate ignition of a propellant charge in chamber 230, as previously described. The described process minimizes the costs and time ordinarily associated with forming a new part, and provides a relatively robust seal between respective inflator chambers, reducing the risk of gas seal failure during airbag deployment.

Referring now to FIG. 6, any of the embodiments of device 40, 140 described above may be incorporated into an inflator used in a vehicle occupant restraint system 200. Vehicle occupant restraint system 200 includes at least one airbag 202 and an inflator 10, 110 coupled to airbag 202 so as to enable fluid communication with an interior of the airbag. As described above, inflator 10 includes a first chamber (not shown) containing a quantity of a first gas generant composition (not shown), a second chamber (not shown) containing a quantity of a second gas generant composition (not shown), and an apparatus (not shown) for igniting the second gas generant composition in response to combustion of the first gas generant composition. As previously described, the ignition apparatus includes a heat-activated auto-ignition material (not shown) in communication with the second gas generant composition, and a thermally-conductive member (not shown) in communication with both the first gas generant composition and the auto-ignition compound. Vehicle occupant restraint system 200 may be in operative communication with a crash event sensor 211 which communicates with a known crash sensor algorithm that signals actuation of vehicle occupant restraint system 200 via, for example, activation of airbag inflator 10, 110 in the event of a collision.

By providing for enhanced sympathetic ignition of propellant in second chamber 30, 130, the present invention obviates the need in many existing designs for a separate initiator apparatus for each of the inflator chambers. Moreover, heat flow between the chambers is improved, which improves the timing and reliability of inflator performance relative to many known designs. It should be appreciated that although the present invention is described above with respect to a dual stage inflator design, ignition enhancement device 40, 140 disclosed herein can be incorporated into other inflator designs, for example three-stage inflator designs.

It is contemplated that the inflator of the present invention will find application in side impact, head curtain, and passenger-side airbag systems as well as in driver-side airbag systems; however, it is not limited thereto. It will also be understood that the foregoing description of an embodiment of the present invention is for illustrative purposes only. As such, the various structural and operational features herein disclosed are susceptible to a number of modification commensurate with the abilities of one of ordinary skill in the art, none of which departs from the scope of the present invention as defined in the appended claims.

The invention claimed is:

1. An inflator comprising:
   a first chamber containing a quantity of a first combustible material;
   a second chamber containing a quantity of a second combustible material; and
   a thermally-conductive ignition apparatus for sympathetically igniting the second combustible material in response to combustion of the first combustible material, the ignition apparatus being in thermal communication with both the first combustible material and the second combustible material, whereby heat from combustion of the first combustible material is communicated along the ignition apparatus to produce ignition of the second combustible material.

2. The inflator of claim 1 wherein the ignition apparatus is positioned intermediate the first and second combustible materials.

3. The inflator of claim 1 further comprising a wall separating the first chamber from the second chamber, and wherein the ignition apparatus is positioned along the wall.

4. The inflator of claim 3 wherein the wall includes an aperture to enable communication between the first and second chambers, and wherein at least a portion of the ignition apparatus is positioned in the aperture.

5. The inflator of claim 1 wherein the first combustible material comprises a first gas generant composition and the second combustible material comprises a heat-activated auto-ignition material.

6. The inflator of claim 5 wherein the ignition apparatus includes a thermally-conductive member, and wherein sympathetic ignition of the auto-ignition material is produced by heat from combustion of the first gas generant composition communicated along the thermally-conductive member.

7. The inflator of claim 6 wherein the auto-ignition material is in direct contact with the thermally-conductive member.

8. The inflator of claim 1 wherein the first combustible material comprises a first gas generant composition and the second combustible material comprises a second gas generant composition.

9. The inflator of claim 8 wherein the ignition apparatus includes a thermally-conductive member and a heat-activated auto-ignition material thermally coupled to the thermally-conductive member, and wherein sympathetic ignition of the second gas generant composition is produced by ignition of the auto-ignition material resulting from heat from combustion of the first gas generant composition communicated along the thermally-conductive member.

10. The inflator of claim 9 wherein the auto-ignition material is in direct contact with the thermally-conductive member.

11. The inflator of claim 9 wherein the second gas generant composition is in direct contact with the auto-ignition material.

12. The inflator of claim 8 wherein the ignition apparatus includes a thermally-conductive member in direct contact with the second gas generant composition, and wherein sympathetic ignition of the second gas generant composition is produced by heat from combustion of the first combustible material communicated along the thermally-conductive member.

13. The inflator of claim 1 wherein the ignition apparatus includes:
a quantity of a heat-activated auto-ignition material; and
a thermally-conductive member in thermal communication with the auto-ignition material, whereby heat received by the thermally-conductive member is communicated to the auto-ignition material to produce ignition of the auto-ignition material.

14. The inflator of claim 1 wherein the ignition apparatus includes a head portion and a longitudinal shaft portion thermally coupled to the head portion.

15. The inflator of claim 14 wherein the ignition apparatus further includes a heat-activated auto-ignition auto-ignition material thermally coupled to the shaft portion.

16. The inflator of claim 14 wherein the head portion comprises a plate having a substantially uniform thickness.

17. A method of manufacturing an inflator comprising the steps of:
providing an inflator body defining an interior cavity;
partitioning the interior cavity into at least a first combustion chamber and a second combustion chamber fluidly isolated from the first combustion chamber, and
providing a thermally-conductive sympathetic ignition device in communication with both the first combustion chamber and the second combustion chamber.

18. The method of claim 17 wherein the step of partitioning the interior cavity comprises the steps of:
providing a wall portion adapted for positioning within the interior cavity, the internal wall including an aperture formed therein for receiving a portion of the thermally-conductive sympathetic ignition device therethrough;
positioning the wall portion within the interior cavity to define the first combustion chamber and a second combustion chamber; and
securing the wall portion within the interior cavity.

19. The method of claim 17 wherein the step of providing thermally-conductive sympathetic ignition device comprises the steps of:
providing a slug formed from a malleable, thermally-conductive material;
providing a die set adapted for engaging the slug to form the slug into the thermally-conductive sympathetic ignition device; and
engaging the slug with the die set to form the slug into the thermally-conductive sympathetic ignition device.

20. A vehicle occupant restraint system comprising:
an airbag system having at least one airbag and an inflator coupled to the airbag so as to enable fluid communication with an interior of the airbag upon activation of the inflator, the inflator including:
a first chamber containing a quantity of a first combustible material;
a second chamber containing a quantity of a second combustible material; and
a thermally-conductive ignition apparatus for sympathetically igniting the second combustible material in response to combustion of the first combustible material, the ignition apparatus being in thermal communication with both the first combustible material and the second combustible material, whereby heat from combustion of the first combustible material is communicated along the ignition apparatus to produce ignition of the second combustible material.

21. A heat-activated ignition apparatus comprising:
a quantity of a heat-activated auto-ignition material; and
a thermally-conductive member in thermal communication with the auto-ignition material, the thermally-conductive member including a portion thereof positioned external to the chamber, whereby heat received by the thermally-conductive member external of the chamber is communicated to the auto-ignition material to produce ignition of the auto-ignition material.

22. The ignition apparatus of claim 21 wherein the thermally-conductive member is formed from a material selected form the group consisting of transition metals and alloys thereof.

23. A method for sympathetically igniting a first combustible material in response to combustion of a second combustible material, the method comprising the step of providing a thermally-conductive member in thermal communication with both the first combustible material and the second combustible material, whereby heat received by the thermally-conductive member from combustion of the first combustible material is communicated to the second combustible material to produce ignition of the second combustible material.

24. The method of claim 23 wherein the step of providing a thermally-conductive member comprises providing a portion of the thermally-conductive member in direct contact with the second combustible material.

25. The method of claim 24 further comprising the step of providing a third combustible material comprising a quantity of a heat-activated auto-ignition material.

* * * * *